US007169770B2

(12) United States Patent
Real et al.

(10) Patent No.: US 7,169,770 B2
(45) Date of Patent: Jan. 30, 2007

(54) METHOD OF ENHANCING REPRODUCTIVE PERFORMANCE IN SOWS

(75) Inventors: Daryl Real, Manhattan, KS (US); Michael D. Tokach, Abilene, KS (US); Steve S. Dritz, Manhattan, KS (US); Jim L. Nelssen, Manhattan, KS (US); Robert D. Goodband, Manhattan, KS (US); Jason Woodworth, Abilene, KS (US); Kevin Q. Owen, Canyon, TX (US)

(73) Assignees: Lonza Ltd., Basel (CH); Kansas State University Research Foundation, Manhattan, KS (US)

(*) Notice: Subject to any disclaimer, the term of this patent is extended or adjusted under 35 U.S.C. 154(b) by 0 days.

(21) Appl. No.: 10/087,198

(22) Filed: Mar. 1, 2002

(65) Prior Publication Data

US 2002/0198185 A1 Dec. 26, 2002

Related U.S. Application Data

(60) Provisional application No. 60/291,920, filed on May 17, 2001.

(30) Foreign Application Priority Data

Apr. 24, 2001 (EP) ................... 01109978

(51) Int. Cl.
*A61K 31/205* (2006.01)
*A61K 31/221* (2006.01)
*A61K 33/24* (2006.01)

(52) U.S. Cl. ................ 514/184; 514/545; 514/554; 514/773; 514/646

(58) Field of Classification Search ........... 514/554, 514/773, 184, 565; 424/646
See application file for complete search history.

(56) References Cited

U.S. PATENT DOCUMENTS

| 4,315,927 A | 2/1982 | Evans |
| 5,124,357 A | 6/1992 | Newton et al. |
| 5,192,804 A | 3/1993 | Blum et al. |
| 5,223,285 A | 6/1993 | DeMichele et al. |
| 5,472,952 A | 12/1995 | Smidt et al. |
| 5,480,659 A | 1/1996 | Tokach et al. |
| 5,614,224 A | 3/1997 | Womack |
| 6,242,487 B1 | 6/2001 | Blum et al. |

FOREIGN PATENT DOCUMENTS

| DE | 199 07 586 | 8/2000 |
| WO | 98/24328 | 6/1998 |
| WO | WO98/24328 | 6/1998 |
| WO | 01/17525 | 3/2001 |

OTHER PUBLICATIONS

Nelssen et al. L-Carnitine and Chromium Picolinate Improve Sow Reproductive Performance, study shows, Swine Update, Kansas State University Animal Sciences and Industry, Spring 2001, vol. 23, No. 2 pp. 1-4.*
Samland et al., Influence of chromium and carnitine on sow reproductive performance, Proc. Am Assoc. Swine Pract. 29 Meet., 69-74, 1998.*
Lindemann, M.D. et al., "Reproductive Response in Swine to the Supplementation of Chromium from Chromium Picolinate" (1994: *J. Anim. Sci.*, vol. 72, Suppl. 2), Abstract 123 on p. 66.
Lindemann, M.D. et al., "Dietary Chromium Picolinate Additions Improve Gain:Feed and Carcass Characteristics in Growing-Finishing Pigs and Increase Litter Size in Reproducing Sows" (1995: *J. Anim. Sci.*, vol. 73), pp. 457-465.
Lindemann, M.D. et al., "Further Assessment of the Effects of Supplementation of Chromium from Chromium Picolinate on Fecundity in Swine" (1995: *J. Anim. Sci.*, vol. 73, Suppl. 1), Abstract 303 on p. 185.
Lindemann, Merlin D., "Chromium: Current Applications—Future Possibilities" (presented at the 1998 Symposium on the Use of Supplemental Chromium to Improve Sow Productivity, Sep. 2, 1998, Prince Agri Products, Inc., Des Moines, IA), pp. G-1-G-6.
Lindemann, Merlin D., "Chromium and Swine Nutrition" (1999: *J. Trace Elem. Exp. Med.*, vol. 12), pp. 149-161.
Purser, Ken W., "Using Chromium Picolinate in Diets for the Swine Breeding Herd" (undated, Prince Agri Products, Inc., "Chromax® Feeding Recommendations", http://www.princeagri.com/chromax/feedrec.html, as of Aug. 25, 2000), 5 pages.
Southern, L.L. et al., "The Potential Effects of Supplemental Chromium" (NFIA, Nutrition Institute, 1992), 14 pages.
Tomkins, Trevor et al., "Meeting Minutes" (Nutrition Council, Nutrition Advisory Committee, Apr. 17, 1996) 4 pages.
Trottier, Nathalie L. et al., "Effect of Supplemental Chromium Tripicolinate on Sow Productivity and Blood Metabolites" (1998 Symposium on the Use of Supplemental Chromium in Sow Diets, Sep. 2, 1998, Prince Agri Products, Inc., Des Moines, IA), pp. B-1-B-9.
Trout, E. et al., "Influence of Dietary Chromium Supplementation on Glucose Tolerance, Insulin Function and Uterine Histotroph Secretion in Gilts" (from the 1997 Research Investment Report), 5 pages.

(Continued)

*Primary Examiner*—Ardin H. Marschel
*Assistant Examiner*—Donna Jagoe
(74) *Attorney, Agent, or Firm*—Darby & Darby

(57) ABSTRACT

The present invention relates to supplementing the diets to sows during the periods of gestation, lactation, and breeding by feeding L-carnitine and chromium. The supplementation enhances pork productivity by increasing the number of pigs born alive in the subsequent reproductive cycle. Sow diets of this invention include L-carnitine and L-carnitine salts and trivalent chromium salts, such as chromium picolinate and chromium nicotinate. L-Carnitine is generally added to the swine feed formulation in the amount of from about 20 to about 1500 ppm, and the trivalent chromium salt is generally added to the swine feed formulation in the amount of from about 20 ppb to about 1000 ppb. The invention also relates to supplemented sow diets and feed supplement formulation.

6 Claims, No Drawings

OTHER PUBLICATIONS

Musser, R.E. et al., "Effects of L-Carnitine on Performance of Gestating and Lactating Sows" in B. Goodband et al., Ed., *Swine Day 1997: Report of Progress 795* (Nov. 1997: Kansas State University Agricultural Experiment Station and Cooperative Extension Service), pp. 31-37.

Musser, R. E. et al., "Added L-Carnitine Fed During Gestating Increases Birth Weight of Pigs," (1997: *Journal of Animal Science*, vol. 75, Suppl. 1), Abstract 250, 1 page.

R.G. Campbell, "The Effects of Chromium Picolinate on the Fertility and Fecundity of Sows under Commercial Conditions", Proc. 16th Annual Prince Feed Ingredient Conf. (Quincy, IL: 1996), 33-38.

C.J. Samland et al., "Effect of L-Carnitine and Chromium Nicolinate on the Ovulation and Fertilization Rate of Gilts", 1999; 5 pages.

Agricultural Research Council, *The Nutrient Requirements of Pigs* (1981: Commonwealth Agricultural Bureaux), pp. 97-119.

J. Arthington, "Millennium Technologies™: The Original L-Carnitine/Chromium Picolinate Supplement. How and Why It Works?" (as of Apr. 27, 2000: Premier Nutrition Technologies, http://www.pntechnologies.com/pignutrition.html), 5 pages.

David H. Baker et al., "Ideal Protein for Swine and Poultry" (1992: *BioKyowa Technical Review—4*, Nutri-Quest, Inc., Chesterfield, MO).

W.T. Cho et al., "Effects of L-Carnitine, Chromium Picolinate with Different Fat Sources on Growth and Nutrient Digestibility in Pigs Weaned at 21 Days of Age" (1999: reprint of *Han'guk Ch'uksan Hakhoechi*, 41(4)), pp. 445-456; and abstract thereof.

S.S. Dritz et al., "Effects of Chromium Picolinate on Reproduction and Farrowing Performance of Parity One Sows" in B. Goodband et al., Ed., *Swine Day 1999: Report of Progress 841* (Nov. 1999: Kansas State University Agricultural Experiment Station and Cooperative Extension Service), pp. 41-44.

M.F. Fuller et al., "The Optimum Dietary Amino Acid Pattern for Growing Pigs: 2. Requirements for Maintenance and for Tissue Protein Accretion" (1989: *British Journal of Nutrition*, vol. 62), pp. 255-267.

K.L. Gross et al., "Dietary Chromium and Carnitine Supplementation Does Not Affect Glucose Tolerance in Obese Dogs During Weight Loss" (May/Jun. 2000: *Journal of Veterinary Internal Medicine*, vol. 14, No. 3), ACVIM Abstract 70, p. 345.

K.L. Gross et al., "Effect of Dietary Carnitine or Chromium on Weight Loss and Body Composition of Obese Dogs" (1998: *Journal of Dairy Science*, vol. 81, Suppl. 1, p. 175): 1998 Joint Meeting Abstract, 1 page.

M.D. Lindemann et al., "Evaluation of Two Nutritional Technologies for Improving Sow Productivity: Is It the Same Pig?" (Aug. 29, 2001: Presented at the Prince Agri Products Swine Reproduction Symposium, Des Moines, IA).

J.L. Nelssen et al., "Nutrition, Deficiencies and Dietetics" in Allen D. Leman et al., ed., *Diseases of Swine, 7th Edition* (1992: Iowa State University Press, Ames, IA), pp. 744-755.

G.L. Newton et al., "Carnitine in Nursery Pig Diets" in *1987 University of Georgia Swine Report, Special Publication No. 44* (1987: The University of Georgia College of Agriculture), pp. 45-49.

*Nutrient Requirements of Swine*, No. 2, Eighth Revised Edition (1979: National Research Council), p. 30.

*Nutrient Requirements of Swine*, Ninth Revised Edition (1988: National Research Council), pp. 50-52.

*Nutrient Requirements of Swine*, Tenth Revised Edition (1998: National Research Council), pp. 110-123.

P.R. O'Quinn, "Effects of Modified Tall Oil on Growing-Finishing Pig Growth Performance, Carcass Characteristics, and Meat Quality Attributes and on Body Composition and Blood and Tissue Levels of Cholesterol, Phospholipids, and α-Tocopherol in Adult Ovariectimized Rats" (1999: Ph.D. Thesis, Kansas State University, Manhattan, KS), pp. 85-103.

P.R. O'Quinn et al., "Effects of Modified Tall Oil, Chromium Nicotinate, and L-Carnitine on Growth and Carcass Traits of Finishing Pigs" (1999: *Journal of Animal Science*, vol. 77, Suppl. 1), Abstract 176, p. 67.

Performance Nutrition Technologies, "Millennium Technologies: The Original L-Carnitine Supplement" and "How Do L-Carnitine and Chromium Picolinate Work?" (as of Apr. 27, 2000: www.pntlabs.com/millennium.html), 2 pages.

Performance Nutrition Technologies, "Millennium Technologies: The Original L-Carnitine Supplement" and "How Do L-Carnitine and Chromium Picolinate Work?" (cached prior to Jul. 17, 2001: www.pntlabs.com/millennium.html), 4 pages.

Performance Nutrition Technologies, "VitaLean" (as of Nov. 2, 2001: http://www.pntlabs.com/vitalean.htm), 3 pages.

D.E. Real et al., "Interactive Effects of Added L-Carnitine and Chromium Picolinate on Sow Reproductive Performance" in B. Goodband et al., Ed., *Swine Day 2001: Report of Progress 880* (Nov. 2001: Kansas State University Agricultural Experiment Station and Cooperative Extension Service), pp. 1-4.

B.T. Richert et al., "Determining the Valine Requirement of the High-Producing Lactating Sow" in B. Goodband et al., Ed., *Swine Day 1994* (Nov. 1994: Kansas State University), pp. 10-14.

C.J. Samland et al., "Ovulation and Fertilization Rate of Gilts Provided Additional L-Carnitine and Chromium Nicotinate" in B. Goodband et al., Ed., *Swine Day 1998: Report of Progress 819* (Nov. 1998: Kansas State University Agricultural Experiment Station and Cooperative Extension Service), pp. 25-27.

Shanghai Luyuan Fine Chemical Factory, "Product—II. Feed Additive" (as of Nov. 19, 2001: http://www.finechem-china.com/product2.html), 5 pages.

J.W. Smith, II, et al., "The Effects of Supplemental Dietary Carnitine, Betaine, and Chromium Nicotinate on Growth and Carcass Characteristics in Growing-Finishing Swine" in B. Goodband et al., Ed., *Swine Day 1994: Report of Progress 717*, (Nov. 1994: Kansas State University Experimental Station), pp. 158-161.

J.W. Smith, II, et al., "The Effects of Dietary Carnitine, Betaine, and Chromium Nicotinate Supplementation on Growth and Carcass Characteristics in Growing-Finishing Pigs" (1994: *Journal of Animal Science: Annual Meeting Abstracts*, vol. 72, Suppl. 1), Abstract 1054, p. 274.

J.W. Smith, II, et al., "The Effects of Supplementing Growing-Finishing Pig Diets with Carnitine and(or) Chromium on Growth and Carcass Characteristics" in B. Goodband et al., Ed., *Swine Day 1996: Report of Progress 772*, (Nov. 1996: Kansas State University Experimental Station), pp. 111-115.

Standing Committee on Agriculture Pig Subcommittee, *Feeding Standards for Australian Livestock: Pigs* (1987: Commonwealth Scientific and Industrial Research Organisation (Australia), East Melbourne, Vic., Australia), pp. 42-43.

Sunglo Feeds, Inc., "Feeds and Feeding" (as of Apr. 28, 2000: Hesston, KS, ShowPig.com, http://specialbydesign.com/showpig/feeds.htm), 5 pages.

A.T. Waylan, "The Effects of Dietary Supplementation of Modified Tall Oil, Vitamin E, Chromium Nicotinate, and L-Carnitine on Pork Quality, Display Color Stability, and Bacon Characteristics" (1999: M.A. Thesis, Kansas State University, Manhattan, KS), pp. 107-136.

A.T. Waylan et al., "The Effects of Swine Dietary Supplementation of Modified Tall Oil, Chromium Nicotinate, and L-Carnitine on Longissimus Muscle Quality Characteristics and Display Color Stability" (1999: *Journal of Animal Science*, vol. 77, Suppl. 1), Abstract 104, p. 50.

A.T. Waylan et al., "Influence of Dietary Supplementation of Modified Tall Oil, Chromium Nicotinate, and L-Carnitine on Pork Chop Display Color Stability, Warner-Bratzler Shear, and Sensory Panel Traits" in B. Goodband et al., Ed., *Swine Day 1999: Report of Progress 841* (Nov. 1999: Kansas State University Agricultural Experiment Station and Cooperative Extension Service), pp. 152-155.

A.T. Waylan et al., "Influence of Dietary Supplementation of Modified Tall Oil, Chromium Nicotinate, and L-Carnitine on Bacon Characteristics" in B. Goodband et al., Ed., *Swine Day 1999: Report of Progress 841* (Nov. 1999: Kansas State University Agricultural Experiment Station and Cooperative Extension Service), pp. 156-158.

Hagen, Chad D et al., "Effect of Dietary Chromium Tripicolinate on Productivity of Sows Under Commercial Conditions," *Swine Health and Production*, vol. 8, No. 2, 2000, pp. 59-63.

* cited by examiner

METHOD OF ENHANCING REPRODUCTIVE PERFORMANCE IN SOWS

This application claims priority from U.S. Provisional application Ser. No. 60/291,920 filed May 17, 2001, which is hereby incorporated herein by reference.

BACKGROUND OF THE INVENTION

Carnitine is a water-soluble, vitamin-like compound that functions to transport fatty acids across the mitochondria membrane where they undergo β-oxidation to produce energy. Previous research has shown that carnitine is effective in decreasing lipid accretion rate (T. L. Weeden et al., "The Effect of L-Carnitine on Starter Pig Performance and Carcass Composition", J. Anim. Sci. 69 (Suppl. 1) (1991), 105 (Abstr.); K. Q. Owen et al., "Effect of L-Carnitine and Soybean Oil on Growth Performance and Body Composition of Early-Weaned Pigs", J. Anim. Sci. 74 (1996), 1612–1619) (hereinafter "Owen et al. (1996)"). However, carnitine may play a greater role in metabolism than just fatty acid transport (K. Q. Owen et al., "Dietary L-Carnitine Suppresses Mitochondrial Branched-Chain Keto Acid Dehydrogenase Activity, and Enhances Protein Accretion and Carcass Characteristics of Swine", J. Anim. Sci. 79 (2001), 3104–3112. Recent studies have observed increases in the total number of pigs born and born alive by feeding L-carnitine during gestation (R. E. Musser et al., "Effects of L-Carnitine Fed During Lactation on Sow and Litter Performance", J. Anim. Sci. 77 (1999), 3296–3303 (hereinafter "Musser et al. (1999a)").

Musser et al. (1999a) fed sows 50 mg/kg of carnitine during lactation and reported minimal differences in farrowing rate, or in total number of pigs born or born alive in three different experiments. In another study, R. E. Musser et al. ("Effects of L-Carnitine Fed During Gestation and Lactation on Sow and Litter Performance", J. Anim. Sci. 77 (1999), 3289–3295) (hereinafter "Musser et al. (1999b)") reported that adding L-carnitine to gestating sow diets had no effect on farrowing rate, but showed an increase in number of pigs born alive in the subsequent parity different from the response in our experiments. The authors also reported no differences in farrowing rate or wean to estrus intervals. The sows were only fed carnitine for one gestation period. See also U.S. Pat. No. 6,342,487.

Musser et al. (1999b) also stated that adding carnitine to the gestation diet improved nutrient utilization. This has also been shown in nursery (D. E. Real et al., "Effects of Dietary L-Carnitine on Growth Performance of Nursery Pigs", J. Anim. Sci., 79 (Suppl. 2) (2001, in press), Abstr.; M. J. Rincker et al., "Effects of Dietary L-Carnitine on Growth Performance and Apparent Nutrient Digestibility in Weaning Pigs", J. Anim. Sci. 79 (Suppl. 2) (2001, in press), Abstr.) and grow-finishing pigs (K. Q. Owen et al., "The Effect of L-Carnitine Additions on Performance and Carcass Characteristics of Growing-Finishing Swine" J. Anim. Sci. 71 (Suppl. 1) (1993), 62 (Abstr.). Owen et al. (1996) reported decreases in daily fat accretion when adding dietary carnitine, potentially by increasing β-oxidation of fatty acids. Gestating sows are generally fed diets that contain low amounts of fat once a day. After all nutrients from the digestive tract have been absorbed, added carnitine could improve the utilization of lipids from body stores, leaving glucose needed for fetal growth. Additionally, increasing the energy density of the diet has been associated with improvements in ovulation rate (B. Flowers et al., "Endocrine Changes Associated with a Dietary-Induced Increase in Ovulation Rate (Flushing) in Gilts", J. Anim. Sci. 67 (1989), 771–778). Therefore, by improving the energy status of the sow additional dietary carnitine could improve ovulation rate.

Chromium is a trace mineral that is involved actively in the metabolism of carbohydrates, lipids, proteins, and nucleic acids in the body. Chromium potentiates insulin action by increasing the cellular uptake of glucose and intracellular carbohydrate and lipid metabolism. Studies have shown that feeding chromium in gestation and lactation increases number born alive (M. D. Lindemann et al., "Further Assessment of the Effects of the Supplementation of Chromium from Chromium Picolinate on Fecundity in Swine", J. Anim. Sci. 73 (Suppl. 1) (1995), 185 (Abstr.) (hereinafter "Lindemann et al. (1995a)"; C. D. Hagen et al., "Effect of Dietary Chromium Tripicolinate on Productivity of Sows under Commercial Conditions", Swine Health Prod. 8 (2000), 59–63 (hereinafter "Hagen et al. (2000)").

There have been several studies investigating chromium supplementation in sow diets. M. D. Lindemann et al., "Dietary Chromium Picolinate Additions Improve Gain: Feed and Carcass Characteristics in Growing-Finishing Pigs and Increase Litter Size in Reproducing Sows", J. Anim. Sci. 73 (1995), 457–465 (hereinafter "Lindemann et al. (1995b)" and Hagen et al. (2000) reported increases in number of pigs born alive with no effects on farrowing rate when adding 200 μg/kg of chromium. Lindemann et al. (1995b) reported this increase in sows over two parities and also reported increases in total number of pigs born, and gestational weight gain. In a follow up study, Lindemann et al. (1995a) reported no improvements in number of pigs born or born alive. Similarly, our study showed no improvements in number born alive, but we did find increases in farrowing rate and tendencies to increase number of stillborn pigs per litter. R. G. Campbell, "The Effects of Chromium Picolinate on the Fertility and Fecundity of Sows under Commercial Conditions", Proc. 16th Annual Prince Feed Ingredient Conf. (Quincy, Ill.: 1996), 33–38, reported improvements in farrowing rate in two experiments, but not in a third trial. These different responses were attributed to differences in inherent fertility of the herds, as control sows in the third experiment had reproductive performance similar to that of supplemented sows in the first two experiments. The authors also reported, although not statistically different, an increase in number of stillborn pigs per litter.

Chromium has been shown to enhance glucose clearance rate in pigs (E. K. Amoikon et al., "Effect of Chromium Tripicolinate on Growth, Glucose Tolerance, Insulin Sensitivity, Plasma Metabolites, and Growth Hormone in Pigs", J. Anim. Sci. 73 (1995), 1123–1139). The study by Lindemann et al. (1995b) reported that feeding 200 μg/kg of chromium to sows decreased plasma insulin and insulin to glucose ratio. This would indicate an increase in insulin sensitivity, which has been associated with improvements in fertility and litter size (J. L. Ramirez et al., Influence of Exogenous Insulin Before Breeding on Conception Rate and Litter Size of Sows", J. Anim. Sci. 75 (1997), 1893–1898).

U.S. Pat. No. 6,303,158 describes using chromium propionate as a dietary supplement to improve the quality of meat of the animal. Specifically, chromium treatment using chromium propionate resulted in significant pork quality responses in pigs fed either low-or high-metabolizable energy diets. Positively affected were increased marbling, reduced moisture in the longissimus dorsi muscle, and reduced purge/drip loss. Additionally, chromium propionate supplementation tended to improve firmness/wetness scores in both low-or high-metabolizable energy diets.

Several references describe supplementing the feed to swine with L-carnitine and chromium: W. T. Cho et al., "Effects of L-Carnitine, Chromium Picolinate with Different Fat Sources on Growth and Nutrient Digestibility in Pigs Weaned at 21 Days of Age" (1999: reprint of Han'guk Ch'uksan Hakhoechi, 41(4)), pp. 445–456, and abstract thereof; M. D. Lindemann et al., "Evaluation of Two Nutritional Technologies for Improving Sow Productivity: Is It the Same Pig?" (Aug. 29, 2001: Presented at the Prince Agri Products Swine Reproduction Symposium, Des Moines, Iowa); B. T. Richert et al., "Determining the Valine Requirement of the High-Producing Lactating Sow" in B. Goodband et al., Ed., Swine Day 1994 (November 1994: Kansas State University), pp. 10–14; C. J. Samland et al., "Effect of L-Carnitine and Chromium Nicotinate on the Ovulation and Fertilization Rate of Gilts", 5 pages. J. W. Smith, II, et al., "The Effects of Dietary Carnitine, Betaine, and Chromium Nicotinate Supplementation on Growth and Carcass Characteristics in Growing-Finishing Pigs" (1994: Journal of Animal Science: Annual Meeting Abstracts, Vol. 72, Suppl. 1, p. 274), Abstract 1054; J. W. Smith, II, et al., "The Effects of Supplementing Growing-Finishing Pig Diets with Carnitine and(or) Chromium on Growth and Carcass Characteristics" in B. Goodband et al.,Ed., Swine Day 1996: Report of Progress 772, (November 1996: Kansas State University Experimental Station), pp. 111–115; A. T. Waylan, "The Effects of Dietary Supplementation of Modified Tall Oil, Vitamin E, Chromium Nicotinate, and L-Carnitine on Pork Quality, Display Color Stability, and Bacon Characteristics" (1997: M. A. Thesis, Kansas State University, Manhattan, Kans.); A. T. Waylan et al., "The Effects of Swine Dietary Supplementation of Modified Tall Oil, Chromium Nicotinate, and L-Carnitine on Longissimus Muscle Quality Characteristics and Display Color Stability" (1999: Journal of Animal Science, Vol. 77, Suppl. 1, p. 50), Abstract #104; A. T. Waylan et al., "Influence of Dietary Supplementation of Modified Tall Oil, Chromium Nicotinate, and L-Carnitine on Pork Chop Display Color Stability, Warner-Bratzler Shear, and Sensory Panel Traits" in B. Goodband et al., Ed., Swine Day 1999: Report of Progress 841 (November 1999: Kansas State University Agricultural Experiment Station and Cooperative Extension Service), pp. 152–155; and A. T. Waylan et al., "Influence of Dietary Supplementation of Modified Tall Oil, Chromium Nicotinate, and L-Carnitine on Bacon Characteristics" in B. Goodband et al., Ed., Swine Day 1999: Report of Progress 841 (November 1999: Kansas State University Agricultural Experiment Station and Cooperative Extension Service), pp. 156–158.

An important factor influencing the productivity of swine operations is the rate of reproduction. Reproductive management includes consideration of growth and metabolism with ovarian function, and adequate energy is required to achieve full reproductive performance. It is known that dietary flushing which requires daily feed intake of sows for approximately two weeks prior to breeding may enhance ovulation rate and is believed to increase litter size.

Such an extended feeding period is costly and, depending on the individual feed intake of every animal, does not work reliably. Also, the impact of varying the feed composition is not clearly understood. Therefore, a need exists for a diet which is cost efficient, predictable, and effective in enhancing the reproductive performance of swine.

BRIEF SUMMARY OF THE INVENTION

The present invention relates to feeding L-carnitine or a salt thereof and a chromium salt to sows to enhance their reproductive performance and supplementing sow diets with L-carnitine and chromium to enhance the sows' farrowing rate. The feeding of carnitine and chromium to sows takes place during gestation and preferably during lactation to enhance their reproductive performance. Further benefits may also be achieved by further so supplementing the sow diet during breeding and the prebreeding period.

Other aspects of the present invention are gestation and lactation diets for sows supplemented with selective amounts of L-carnitine or a salt thereof and a chromium salt.

Still another aspect of the invention is a flowable powder containing L-carnitine or a salt thereof and a chromium salt especially prepared for admixture with the sow diets.

DETAILED DESCRIPTION OF THE INVENTION

All patents, patent applications and literature references cited in this specification are hereby incorporated by reference in their entirety.

The present invention relates to enhancing the reproductive performance, in particular the farrowing rate, of sows by feeding a composition comprising L-carnitine or salts thereof and a source of chromium, preferably, chromium picolinate.

Surprisingly, such a combination has a synergistic effect on the reproductive performance; e.g., the farrowing rate is enhanced over at least two periods of gestation. In particular, the farrowing rate is enhanced for sows which already have passed through a first cycle of gestation, breeding and lactation.

In addition, in accordance with the invention, the percentage of early return to estrus in parity one is increased; the percentage of weaned parity one sows that farrowed in parity two improved; for the two parities, the total number and number of pigs born alive increased for all sows; and the number of sows on the combination treatment completing the study was greater as compared to the control sows and those treated with but a single component.

Another embodiment of the instant invention is a feed supplement composed of 40 to 60 parts of L-carnitine or a salt thereof, 0.5 to 4 parts of a trivalent chromium salt, 25 to 50 parts of a carrier, and 10 to 25 parts of water. Preferably, the composition contains 45 to 55% of L-carnitine or a salt thereof, 1 to 3 parts of a trivalent chromium salt, 30 to 40 parts of a carrier, and 12 to 20 parts of water.

These feed supplements are free flowing powders having a color of white to pink and a bulk density of from about 450 g/l to 500 g/l. Handling of such food supplements requires no special protective measures or precautions against fire. Admixing the food supplement with the specific sow feeds described herein is easily performed by those skilled in the art.

The L-carnitine useful in the present invention may be L-carnitine or a salt thereof. Examples of L-carnitine salts include L-carnitine L-tartrate, L-carnitine fumarate, L-carnitine chloride, and L-carnitine-magnesium-citrate, though any physiologically safe salt may be used. The material may be encapsulated or otherwise protected. The L-carnitine may be added to feed in the form of coated particles, e.g., silica or starch particles, or as conglomerates with, e.g., edible waxes.

With regard to the chromium useful in the present invention, any trivalent form of chromium may be used, including inorganic salts such as chromium chloride. Preferably, the chromium is a salt complex with physiologically compatible acids, such as amino acids, nicotinic acid, picolinic acid, or mixtures thereof, complexes such as chelates, proteinates and chromium yeast. Pure complexes of nicotinic or picolinic acid complexes are preferred since they are readily resorbed in the gut of an animal. Chromium (III) picolinate and nicotinate are most preferred according to the present invention, since they display the most pronounced effect if fed in conjunction with L-carnitine or its salts.

The carnitine and chromium are present in the feed formulation of the invention in an amount effective to achieve the desired improvement in reproductive performance. This improvement can be of any level above the litter and pig performance of swine fed a diet without carnitine nor chromium, as even the small differences in farrowing have significant effect on meat productivity. According to the present invention, carnitine is added to conventional diet (including drinking water) from about 20 to about 1500 ppm, preferably from about 50 to 1000 ppm. Chromium is added from about 20 ppb (based on active chromium) to about 1000 ppb, preferably from about 50 to about 800 ppb, and most preferably from 50 to 500 ppb. The ratio between added carnitine and added chromium is generally from 200:1 to 400:1, preferably from 200:1 to 300:1, based on active chromium. The specific effect of such combination on reproductive performance comes as a surprise, since prior art has failed to demonstrate synergism in view of more commonly expected effects of chromium and carnitine, e.g., on lean body mass.

Preferably, dietary treatment is administered daily through the initial gestation period up to lactation and farrowing, ideally starting on the first day of breeding and even during the period 120 days before breeding (prebreeding). The diets fed during the prebreeding period and during breeding are well known in the art. The concentration of the feed supplements of the invention are substantially the same during prebreeding as those fed during the gestation period.

The following table shows the broad and preferred ranges of the L-carnitine and chromium (based on active chromium) fed per day during the lactation, breeding, and gestation phases.

TABLE I

| Phase | Daily Intake | |
|---|---|---|
| | Broad Ranges | Preferred Range |
| Breeding | | |
| L-carnitine, mg/day | 50 to 4,000 | 125 to 3,000 |
| chromium, µg/day | 0.05 to 3 | 0.15 to 2 |
| Gestation | | |
| L-carnitine, mg/day | 35 to 3,000 | 75 to 2,000 |
| chromium, µg/day | 0.03 to 2 | 0.1 to 1.5 |
| Lactation | | |
| L-carnitine, mg/day | 100 to 7,500 | 250 to 5,000 |
| chromium, µg/day | 0.1 to 5 | 0.25 to 4 |

Admixing the feed supplement with the specific sow feeds described herein is easily performed by those skilled in the art.

The base diet of the present invention can be any typical swine diet known in the art, including those specially formulated for gestating or lactating swine. For example, a typical diet will include a selection of the ingredients described below. Extensive guidance in formulating diets for the feeding of swine can be found in "Nutrient Requirements of Swine", *Nutrient Requirements of Domestic Animals*, Number 3, 9th rev. ed. (National Academy of Science, Washington, D.C.: 1988).

In the United States, most swine are fed a diet consisting of about 97% milo or corn in combination with soybean, the remaining 3% consisting of carriers combined with one or more inorganic elements, vitamins, or antimicrobial compounds. For example, a standard diet may contain 79.5% corn; 17.4% soybean meal; 0.9% defluorinated phosphate; 0.65% limestone meal (35% Ca); 0.25% sodium chloride; 0.25% vitamin premix; 0.25% trace element premix; and 0.25% antimicrobial premix. Oats, sorghum, and synthetic amino acids are sometimes added. In Europe, corn and soybean meal are generally not as available nor as cost effective as beans, peas, barley, wheat, rape seed meal, cassava (tapioca), molasses, fish, bone, and meat meal. These are acceptable although not preferred amino acid sources.

In formulating the diets for gestating or lactating swine, a person of skill in the art can use the general knowledge in the art. For example, the Nutrient Requirements of Swine can be consulted to determine the amino acids, mineral elements, vitamins, and other dietary requirements for swine as a function of weight. The diet can contain between 5 and 30% by weight crude protein and be formulated for the specific use as a gestation or a lactation diet. For example, a gestating swine diet may contain from about 100 to about 400 grams per head per day (g/hd/day) of crude protein, from about 7 to about 14 g/hd/day of lysine, from about 12 to about 18 g/hd/day of calcium, and from about 10 to about 16 g/hd/day of phosphorus. An exemplary lactating swine diet may contain from about 600 to about 1800 g/hd/day of crude protein, from about 30 to about 70 g/hd/day of lysine, from about 35 to about 55 g/hd/day of calcium, and from about 30 to about 50 g/hd/day of phosphorus.

A further example of recommended daily nutrient levels during gestation and lactation expressed in grams per head per day, except where noted otherwise, is shown in Table II.

TABLE II

| COMPONENT | GESTATION | LACTATION |
|---|---|---|
| Crude Protein | 250 | 899 |
| Lysine | 11 | 44 |
| Tryptophan | 2.5 | 11 |
| Threonine | 8 | 32 |
| Minerals | | |
| Calcium | 16 | 48 |
| Phosphorus | 14.5 | 43 |
| Salt | 9 | 27 |
| Copper, mg | 30 | 90 |
| Iodine, mg | .54 | 1.6 |
| Iron, mg | 300 | 900 |
| Manganese, mg | 72 | 216 |
| Selenium, mg | .18[a] | .54[b] |
| Zinc, mg | 300 | 900 |
| Vitamins | | |
| Vitamin A, IU | 20,000 | 60,000 |
| Vitamin D, IU | 3,000 | 9,000 |
| Vitamin E, IU | 80 | 240 |
| Vitamin K,[c] mg | 8 | 24 |
| Riboflavin, mg | 15 | 45 |
| Niacin, mg | 90 | 270 |
| d-Pantothenic Acid, mg | 52 | 156 |
| Vitamin $B_{12}$, mg | .06 | .18 |
| Folic Acid, mg | 3 | 9 |
| Biotin, mg | .4 | 1.2 |
| Choline, mg | 1,000 | 3,000 |

[a]Legal addition if fed 4 lb/hd/day.
[b]Assumes at least 12 lb/day feed intake of a diet containing .80% lysine.
[c]Menadione sodium bisulfite (MSB) or equivalent.

As shown in Table II, feed formulations for gestating swine are different from feed formulations for lactating swine. Generally, a requirement for protein, lysine, tryptophan, and threonine is from about 3.5 to about 4 times higher for lactating swine. Table III shows other feed components necessary for both types of feeds may be, for example, in the following ranges, expressed in pounds of a component per 2000 pounds of feed:

TABLE III

| COMPONENT | GESTATION DIET | LACTATION DIET |
|---|---|---|
| Milo or Corn, lb | 1,533–1,684 | 1,359–1,568 |
| Soybean Meal, lb (46.5%) | 235–379 | 343–557 |
| Monocalcium Phosphate, lb | 37–46 | 41–45 |
| Limestone, lb | 20 | 19–20 |
| Salt, lb | 10 | 10 |
| Sow Add Pack, lb | 5 | 5 |
| Vitamin Premix, lb | 5 | 5 |
| Trace Mineral Premix, lb | 3 | 3 |
| Selenium Premix, lb | 1 | 1 |

Suitable swine to be fed the diet of the present invention include but are not limited to all standard breeds of meat-producing or breeding pigs. Preferred are swine such as large white breeds and swine derived from specific breeding companies (PIC, Newsham, Dekalb, and others).

The feed schedule and feed rates used with the present method can be any standard schedule and rate used in the art. Generally, gestating swine are fed from about 4 to about 6 pounds of the diet per day, and preferably from about 4 to about 5 pounds per day. Lactating swine are generally fed from about 9 to about 15 pounds of the diet per day, and preferably from about 13 to about 14 pounds per day. Generally, the feed is administered from 1 to 2 times a day for gestating swine and from 1 to 2 and up to 4 times a day for lactating swine.

The following non-limiting example is representative of the present invention.

EXAMPLE 1

Effect of L-Carnitine and Chromium Tris-Picolinate Fed from First Day of Breeding Through a Second Gestation Period (2 Parities)

This experiment was conducted on a commercial 1,500 sow farrow-to-wean operation in central Kansas and used 599 sows (PIC Line C22). Experimental treatments were arranged in a 2×2 factorial with main effects of added L-carnitine (0 or 50 ppm) and chromium tris-picolinate (0 or 200 ppb). Sows were started on test on the first day of breeding. Each sow remained on the same treatment through gestation, lactation, and through a second gestation period (2 parities). During gestation, all sows were fed a grain sorghum-soybean meal-based diet formulated to contain 0.65% lysine, 0.83% Ca, and 0.76% P. In lactation, all sows were fed a grain sorghum-soybean meal based diet formulated to contain 1.10% lysine, 0.90% Ca, and 0.80% P (Table 3). Dietary treatments were provided via a corn-based top dress fed at 30 g/d. The top dress was formulated to provide 90 mg/d and 250 mg/d carnitine in gestation and lactation, respectively. Chromium tris-picolinate was provided at 360 mcg/d and 1,000 mcg/d during gestation and lactation, respectively. These inclusions were calculated to provide 50 mg/kg carnitine (CarniFeed, Lonza Inc., NJ) and 200 mcg/kg chromium (Chromapure, Lonza Inc., NJ) when sows were fed 4 lb/d of the gestation diet and 11 lb/d of the lactation diet. The top dress was added to the top of the feed box between meals in order to be consumed with the rest of the diet. The top dress was color-coded (1% dyed corncobs) by treatment to assure proper distribution of experimental treatments.

At farrowing, the number of pigs born alive, as stillborn, as mummies, and total born were recorded. Total born was the sum of the number of pigs born alive, stillborn, and mummies. Sows were rebred after weaning (15 d lactation) and remained on the same treatment until farrowing a second litter. If a sow did not return to estrus within 18 days, she was removed from the experiment. Sows that were bred at the start of the study, but were later found open, were removed from the trial. Procedures and data collection were identical for the second gestation and lactation period. However, dietary treatments were not administered during the second lactation period.

Calculations were made to determine the total number of pigs born, born alive, as stillborns, or as mummies per sow for the two parities. Total number of pigs were calculated using only sows that initially farrowed, then completed the second parity, as well as calculated from all the sows that were actually started on test.

Data were analyzed using the MIXED procedure of SAS. Sow was the experimental unit for the analysis with parity, previous lactation length, and/or week of farrowing as a covariate (Table IV) for total born, number of pigs born alive, mummies, and stillborn. A chi-square statistic was calculated to determine differences among treatments when analyzing percent in estrus and farrowing rate.

TABLE IV

Common Diet Compositions[a]

| INGREDIENT, % | GESTATION[b] | LACTATION[c] |
|---|---|---|
| Diet | | |
| Grain sorghum | 80.18 | 64.10 |
| Soybean meal (46.5%) | 15.68 | 31.75 |
| Other vitamin and trace mineral additions[d] | 4.04 | 4.15 |
| Total | 100.0 | 100.0 |
| Top dress[e] | | |
| Corn[f] | 99.0 | 99.0 |
| Corncobs[g] | 1.0 | 1.0 |

[a]All sows fed similar basal diet.
[b]Sows were fed 4 lb/d gestation diet (0.7% lysine, 0.83% Ca, and 0.76% P).
[c]Sows were fed 11 lb/d lactation diet (1.0% lysine, 0.90% Ca, and 0.80% P).
[d]Provided 10,000,000 IU vitamin A, 1,500,000 IU vitamin $D_3$, 40,000 IU vitamin E, 4,000 mg menadione, 40 mg vitamin $B_{12}$ 9,000 mg riboflavin, 30,000 mg pantothenic acid, 50,000 mg niacin, 150 g zinc, 150 g iron, 36 g manganese, 15 g copper, 270 mg iodine, 270 mg selenium, 500,000 mg choline, 200 mg biotin, 1,500 mg folic acid, and 13,750 mg pyridoxine per ton of diet.
[e]Topdress (30 g/d) was added to the top of the feed box between meals to provide carnitine and/or chromium with the rest of the feed at the next meal.
[f]L-carnitine and/or chromium replaced corn to achieve dietary supplementation of 90 mg/d carnitine in gestation, 250 mg/d carnitine in lactation, 360 mcg/d chromium in gestation, and 1,000 mcg/d chromium in lactation.
[g]Colored corncobs were added to distinguish treatments among one another.

TABLE V

Effects of L-Carnitine and Chromium Picolinate on Reproductive Performance[a]

| Item | Control | Carnitine[b] | Chromium[c] | Both[bc] | SEM | Carnitine | Chromium | Int. |
|---|---|---|---|---|---|---|---|---|
| | | | | | | | Probabilities, P< | |

First parity

| Item | Control | Carnitine[b] | Chromium[c] | Both[bc] | SEM | Carnitine | Chromium | Int. |
|---|---|---|---|---|---|---|---|---|
| No. of sows | | | | | | | | |
| Started on test | 148 | 150 | 147 | 154 | | | | |
| Farrowed | 123 | 140 | 138 | 142 | | | | |
| First service FR %[dei] | 82.9 | 91.9 | 95.5 | 92.2 | 2.38 | 0.22 | 0.01 | 0.01 |
| No. of pigs | | | | | | | | |
| Total born[e] | 11.3 | 11.4 | 11.5 | 11.6 | 0.30 | 0.62 | 0.57 | 0.90 |
| Born alive[e] | 10.0 | 9.8 | 10.2 | 10.2 | 0.25 | 0.32 | 0.63 | 0.71 |
| Stillborn[e] | 0.95 | 0.98 | 1.26 | 1.13 | 0.130 | 0.68 | 0.07 | 0.52 |
| Mummies | 0.34 | 0.26 | 0.39 | 0.34 | 0.060 | 0.26 | 0.29 | 0.77 |
| WEI d[dgh] | 4.9 | 4.6 | 4.7 | 4.5 | 0.01 | 0.05 | 0.23 | 0.75 |
| % estrus by d 7[egi] | 84.8 | 88.6 | 86.7 | 92.3 | 2.88 | 0.08 | 0.31 | 0.73 |
| % estrus by d 18[egi] | 88.1 | 91.5 | 91.7 | 94.4 | 2.49 | 0.20 | 0.17 | 0.89 |

Second parity

| Item | Control | Carnitine[b] | Chromium[c] | Both[bc] | SEM | Carnitine | Chromium | Int. |
|---|---|---|---|---|---|---|---|---|
| No. of sows | | | | | | | | |
| Weaned parity 1 | 123 | 140 | 138 | 142 | | | | |
| Bred by d 18 | 108 | 128 | 127 | 134 | | | | |
| Farrowed | 87 | 104 | 102 | 122 | | | | |
| First service FR %[degi] | 81.2 | 81.3 | 79.7 | 91.1 | 3.49 | 0.07 | 0.20 | 0.08 |
| Percentage of weaned parity 1 sows that farrowed parity 2 [degi] | 70.7 | 73.9 | 74.3 | 85.9 | 3.81 | 0.04 | 0.03 | 0.24 |
| No. of pigs | | | | | | | | |
| Total born[eg] | 11.1 | 11.2 | 11.0 | 11.4 | 0.37 | 0.50 | 0.94 | 0.81 |
| Born alive[eg] | 9.7 | 9.9 | 9.5 | 9.8 | 0.33 | 0.53 | 0.62 | 0.89 |
| Stillborn[e] | 1.02 | 1.02 | 1.09 | 1.31 | 0.149 | 0.43 | 0.19 | 0.45 |
| Mummies | 0.35 | 0.33 | 0.40 | 0.25 | 0.071 | 0.22 | 0.88 | 0.29 |
| WEI[dgh] | 4.6 | 4.7 | 4.6 | 4.8 | 0.01 | 0.14 | 0.94 | 0.46 |
| % estrus by d 7[efgi] | 80.3 | 76.9 | 81.0 | 75.0 | 4.32 | 0.23 | 0.88 | 0.75 |
| % estrus by d 18[efgi] | 80.2 | 80.8 | 82.9 | 75.9 | 4.17 | 0.40 | 0.77 | 0.32 |

Total pigs per sow for sows that completed parity one

| Item | Control | Carnitine[b] | Chromium[c] | Both[bc] | SEM | Carnitine | Chromium | Int. |
|---|---|---|---|---|---|---|---|---|
| Total born[eg] | 19.4 | 19.8 | 19.5 | 21.3 | 0.59 | 0.04 | 0.15 | 0.25 |
| Born alive[eg] | 17.1 | 17.6 | 16.8 | 18.5 | 0.53 | 0.03 | 0.55 | 0.24 |
| Stillborn[e] | 1.7 | 1.7 | 2.1 | 2.3 | 0.19 | 0.46 | 0.01 | 0.66 |
| Mummies | 0.6 | 0.5 | 0.6 | 0.6 | 0.08 | 0.17 | 0.43 | 0.85 |

Total pigs per sow of all sows started on test for two parities

| Item | Control | Carnitine[b] | Chromium[c] | Both[bc] | SEM | Carnitine | Chromium | Int. |
|---|---|---|---|---|---|---|---|---|
| Total born[eg] | 15.8 | 18.4 | 18.8 | 19.7 | 0.71 | 0.01 | 0.003 | 0.24 |
| Born alive[eg] | 13.9 | 16.3 | 16.2 | 17.0 | 0.63 | 0.01 | 0.02 | 0.23 |
| Stillborn[e] | 1.4 | 1.6 | 2.0 | 2.1 | 0.17 | 0.35 | 0.002 | 0.94 |
| Mummies | 0.5 | 0.5 | 0.7 | 0.5 | 0.71 | 0.27 | 0.16 | 0.42 |

[a]Initially 599 sows bred.
[b]50 mg/kg L-carnitine provided as top dress daily.
[c]200 mcg/kg chromium picolinate provided as top dress daily.
[d]FR = First service farrowing rate; WEI = wean to estrus interval.
[e]Parity was used as a covariate; 6.0, 5.6, 5.2, and 5.5 for control, carnitine, chromium, and both, respectively.
[f]Previous lactation length was used as a as covariate; 15.2, 15.8, 15.7, and 15.4 for each treatment.
[g]Week of year sow farrowed was used as a covariate; 23.6, 23.9, 23.7, and 23.9 for each treatment.
[h]WEI analyzed as inverse of means, previous WEI analyzed as log of means.
[i]P-values from chi-square statistic.

Results and Discussion: The data show that adding dietary carnitine and chromium improved the number of sows in estrus by day 7 and 18.

In parity 2, it was found that adding carnitine and chromium together in the diet increased first service farrowing rate, while adding either carnitine or chromium alone did not influence farrowing rate. Feeding additional dietary carnitine and chromium increased the percentage of sows that were weaned from parity 1 and farrowed in parity 2. This calculation is a combination of the return to estrus interval and farrowing rate.

Having described this invention and its benefits in detail above, it will be apparent that a skilled practitioner can make modifications and changes of the invention without departing from the scope or spirit of the claims which follow.

The following table shows the effects of the combination treatment on sow longevity of the herd:

TABLE VI

Effects of L-Carnitine and Chromium Picolinate on Sow Longevity in Sow Herd

| | Treatment | | | |
|---|---|---|---|---|
| Item | Control | Carnitine[a] | Chromium[b] | Both[ab] |
| First parity No. of sows | | | | |
| Started on test | 148 | 150 | 147 | 154 |
| Farrowed in parity 1 | 123 | 140 | 138 | 142 |
| Farrowed in parity 2 | 87 | 104 | 102 | 122 |
| Number of sows removed from experiment | 61 | 46 | 45 | 32 |

[a]50 mg/kg L-carnitine provided as top dress daily.
[b]200 mcg/kg chromium picolinate provided as top dress daily.

The data above compare the number of sows that started the trial and the number of sows that completed the trial. In the case of the sows treated with the combination of the invention, the number of sows completing the trial is significantly greater as compared to the control sows and the sows fed carnitine only and chromium only. This is of particular economic significance because of the high cost of replacement gilts.

All patents, patent applications, articles, and publications mentioned above are hereby incorporated by reference.

Many variations of the present invention will suggest themselves to those skilled in the art in light of the above detailed description. Such obvious variations are within the full intended scope of the appended claims.

We claim:

1. A method of enhancing the reproductive performance as measured by the farrowing rate in the second parity of a sow which comprises feeding to a sow during two consecutive periods of gestation and, optionally, during lactation, breeding and/or prebreeding amounts of L-carnitine or a salt thereof and chromium tripicolinate sufficient to enhance the farrowing rate of said sow in the second parity.

2. The method of claim 1 wherein, during gestation, the sow is fed from about 9 to 14,000 mg/day of L-carnitine or its salt and from 0.05 to 5 µg/day of said chromium tripicolinate and, during lactation, from about 20 to 34,000 mg/day of L-carnitine or its salt and from 0.1 to 10 µg/day of said trivalent chromium salt.

3. A method of enhancing reproductive performance as measured by the farrowing rate in the second parity in a sow which comprises feeding to a sow, during two consecutive periods gestation and, optionally, during lactation, breeding and/or prebreeding a sow diet supplemented with amounts of L-carnitine or a salt thereof and chromium tripicolinate sufficient to enhance the farrowing rate of said sow in the second parity.

4. The method of claim 3 wherein the sow diet administered during gestation and lactation, is supplemented with from 20 to 1500 ppm of L-carnitine and 20 to 1000 ppb of chromium tripicolinate.

5. A method of enhancing the reproductive performance as measured by the farrowing rate in the second parity of a group sows which comprises feeding to a group sows during two consecutive periods of gestation and, optionally, during lactation, breeding and/or prebreeding amounts of L-carnitine or a salt thereof and chromium tripicolinate sufficient to enhance the farrowing rate of said group of sows in the second parity.

6. The method of claim 5, wherein, during gestation, each sow is fed from about 9 to 14,000 mg/day of L-carnitine or its salt and from 0.05 to 5 µg/day of said chromium tripicolinate and, during lactation, from about 20 to 34,000 mg/day of L-carnitine or its salt and from 0.1 to 10 µg/day of said trivalent chromium salt.

* * * * *